April 23, 1957 W. SIX ET AL 2,790,030
CIRCUIT-ARRANGEMENT FOR USE IN AUTOMATIC TELEPHONE SYSTEMS
Filed Feb. 9, 1953
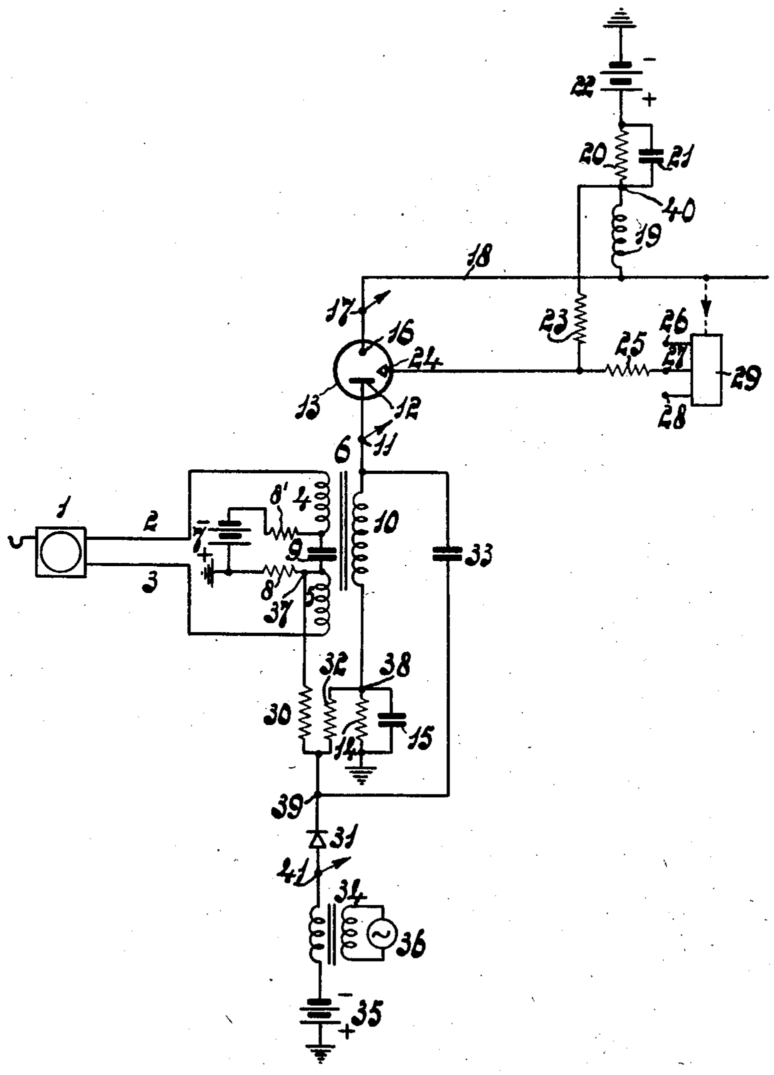
INVENTORS
WILLEM SIX
JACOBUS DOMBURG
BY [signature]
AGENT

United States Patent Office 2,790,030

Patented Apr. 23, 1957

2,790,030

CIRCUIT-ARRANGEMENT FOR USE IN AUTOMATIC TELEPHONE SYSTEMS

Willem Six and Jacobus Domburg, Emmasingel, Eindhoven, Netherlands, assignors, by mesne assignments, to North American Philips Company, Inc., New York, N. Y., a corporation of Delaware Application February 9, 1953, Serial No. 335,836

Claims priority, application Netherlands February 29, 1952

3 Claims. (Cl. 179—16)

The invention relates to a circuit-arrangement for use in an automatic telephone system. Systems of this kind are known, in which the contacts between line finders and selectors in an intelligence connection between two subscribers are formed electronically by a discharge path in a discharge tube. If the discharge path is conductive, the contact is, so to say, closed and can convey intelligence currents or signals, whereas the non-conductive condition of a discharge path corresponds to the open condition of the contact. In known systems these discharge paths are provided for example in cathode-ray tubes.

It has, moreover, been suggested to use a system in which the connections are established with the aid of gas-filled tubes. In this system the subscribers' lines are coupled through a transformer to one side of the main discharge paths of a plurality of gas-filled tubes, whereas the other sides of the discharge paths are connected to intelligence conductors in different connecting circuits. The arrangement is furthermore such that when a call is made, a gas-filled tube coupling the subscriber's line concerned with a free connecting circuit ignites and thus establishes the connection with this circuit. In such a system it is, in principle, not necessary to give a dialling tone before the subscriber begins to dial, since the connection with a connecting circuit is established substantially instantaneously. However, it may occur that all connecting circuits are engaged, in which case none of the gas-filled tubes can ignite and the subscriber does not obtain the connection. It is desirable to inform the subscriber of this condition by means of a busy tone.

In the circuit-arrangement according to the invention an intelligence connection between the subscriber's line and the further connection apparatus, for example, a connecting circuit or a selector, may be established through a discharge path of a discharge tube, a first winding of a transformer and a first resistor being connected in series with this discharge path on the side of the subscriber's line, the subscriber's line being coupled with the first resistor through at least one further winding of the transformer, a second resistor being connected in series with this further winding.

According to the invention provision is made of a busy-tone generator and further circuit elements for coupling the busy-tone generator with the subscriber's line, these circuit elements being controlled by the voltage at a point of the first resistor and the voltage of a point of the second resistor in a manner such that a busy tone is transmitted to the subscriber's line only if the circuit of the subscriber's line is complete and if the discharge path is at the same time not conductive.

In order that the invention may be readily carried into effect, it will now be described in detail with reference to the accompanying drawing.

The station 1 of a subscriber is connected through the intelligence conductors 2 and 3 to ends of two identical primary windings 4 and 5 of the transformer 6. The other end of the winding 4 is connected through a resistor 8′ to the negative terminal of a supply source 7, the voltage of which is 60 v. The other end of the winding 5 is connected through a resistor 8 to the earthed positive terminal of the supply source 7. The ends of the windings 4 and 5, remote from the intelligence conductors 2 and 3, are connected to one another via the capacitor 9. One end of the secondary winding 10 of the transformer 6 is connected through the multiple-wire point 11 to the cathode 12 of the gasfilled tube 13. The other end of the winding 10 is connected through the parallel combination of a resistor 14 and a capacitor 15 to earth. The anode 16 of the tube 13 is connected via the multiple-wire point 17 to the intelligence conductor 18 of a connecting circuit, this intelligence conductor being connected through the choke 19 and the parallel combination of a resistor 20 and a capacitor 21 to the positive terminal of the supply source 22, the negative terminal of which is connected to earth and the voltage of which is 160 v. The ignition electrode 24 of tube 13 is connected on the one hand through a resistor 23 to the junction 40 of the resistor 20 and the choke 19 and on the other hand through a resistor 25 to one of the outputs 26, 27, 28 of the marking switch 29 (shown diagrammatically). The multiple-wire point 11 is connected in an identical manner by means of additional gas-filled tubes to additional connecting circuits and conversely the multiple-wire points of these connecting circuits are connected through gas-filled tubes to other subscribers' lines.

The junction 37 of the winding 5 and the resistor 8 is connected through a resistor 30 to a terminal of a rectifier 31, this terminal being furthermore connected through a resistor 32 to the junction 38 of the winding 10 and the resistor 14 and, moreover, through a capacitor 33 to the multiple-wire point 11. The other terminal of the rectifier 31 is connected through a winding of the transformer 34 to the negative terminal of the supply source 35, the positive terminal of which is connected to earth and the voltage of which is 10 v. A busy-tone generator 36 is connected to a second winding of a transformer 34.

This circuit-arrangement operates as follows. In the rest position the gas-filled tube 13 is extinguished. The potential of the output point 27 of the marking switch 29 has a value such that the potential of the ignition electrode 24, which is connected to the potentiometer 20, 23, 25 is slightly lower than the ignition voltage between the ignition electrode 24 and the cathode 12 of the gas-filled tube 13. The points 37 and 38 have earth potential, so that the point 39 also has earth potential and the rectifier 31 is cut off. If the subscriber 1 lifts the receiver, the line loop across the intelligence conductor 2, 3 and the subscriber's station is completed so that a voltage pulse is produced across the windings 4 and 5, this pulse being transmitted by the transformer 6 to the winding 10 with a polarity such that the potential of the cathodes 12, connected to the multiple-wire point 11, is decreased to such an extent that all gas-filled tubes connecting the multiple-wire point 11 to free connecting circuits are adapted to ignite. However, as soon as one of these gas-filled tubes, for example, the gas-filled tube 13, begins to ignite, a current begins to flow from the positive terminal of the supply source 22 across the resistor 20, inductor 19, intelligence conductor 18, multiple-wire point 17, anode 16, main discharge path of the gas-filled tube 13, cathode 12, multiple-wire point 11, winding 10 and resistor 14 to earth, so that the potential of the multiple-wire point 11 increases to such an extent that the other gas-filed tubes cannot ignite. The said current decreases, moreover, the potential of the point 40 to 110 v., so that the potential of the ignition electrodes of the other gas-filled tubes, connected to the multiple-wire point 17, these ignition electrodes being connected through resistors 23 to the point 40, drops comparatively far below the ignition voltage. The connecting circuit concerned is thus marked busy, since other gas-filled tubes coupling this connecting circuit to the other subscribers' lines can no longer ignite when a call is made.

The subscriber 1 then dials the desired number. The dialling signals are transmitted by the transformer 6 and the gas-filled tube 13 to the intelligence conductor 18 and then to the marking switch 29 in a manner which is irrelevant in this case and not shown. The marking switch 29, which may be of a kind known per se, then increases the voltage of one of its output points 26, 27, 28, and so on in accordance with the digit received, each of these output points corresponding with a definite digit. Thus, through the resistor 25, the potential of the ignition electrode 24 of the gas-filled tube connecting the multiple-wire point 17 to the line of the wanted subscriber is increased, so that this gas-filled tube ignites, if this subscriber is free. Thus the desired connection is established.

However, if the subscriber called had been engaged, the cathode of the gas-filled tube concerned would have had a potential of 50 v. instead of earth potential, which would have prevented this gas-filled tube from igniting.

As has been stated the points 37 and 38 are at earth potential in the rest position of the circuit-arrangement, i. e. as long as the line loop is open and none of the tubes connected to the point 11 is conductive. When the line loop is completed, the voltage of point 37 drops to −30 v. If a free connecting circuit is available, one of the said tubes ignites immediately, so that the potential of point 38 increases to +50 v. The potential of point 39 then assumes a value of +10 v., if it is assumed that resistors 30 and 32 are identical, so that the rectifier 31 remains cut off. After the connection with the wanted subscriber has been established through a second gas-filled tube connected to the point 17, the potential of point 38 drops to 33 v., so that point 39 assumes a potential of 1.5 v. However, the rectifier 31 remains cut off, since the potential of point 41 is −10 v. However, if no free connecting circuit had been available, no gas-filled tube would have ignited when the line loop was completed, so that point 38 would have remained at earth potential. In this case the potential of point 39 drops to −15 v., so that the rectifier 31 becomes conductive and a busy-tone current begins to flow through the circuit from earth through the supply source 35, the winding of transformer 34, rectifier 31, capacitor 33, winding 10 and the parallel combination of resistor 14 and capacitor 15 back to earth, so that the transformer 6 transmits a busy tone to the subscriber's line. Consequently the subscriber receives a busy tone only if the line loop is completed and none of the tubes connected to the point 11 is conductive.

Within the frame of the invention the circuit-arrangement may be modified in various ways. For example, instead of using the rectifier 31 as a switching-element, use may be made, as an alternative, of a discharge tube, which is controlled in a suitable manner in accordance with the voltage at points 37 and 38.

What is claimed is:

1. A circuit-arrangement in an automatic telephone system in which an intelligence connection between a subscriber line and a further connecting apparatus is established through the discharge path of a discharge tube, said arrangement comprising a transformer having a first winding and a second winding, said first winding being connected in series with the discharge path of said discharge tube and said second winding being connected to said subscriber line to receive signals therefrom, means for selectively completing the circuit of said subscriber line, a first resistor connected in series with said first winding, a second resistor connected in series with said second winding, a busy-tone generator, and means connecting said busy-tone generator to said first and second resistors to effect control of the transmission of the busy-tone by the voltage drops across said resistors, whereby a busy-tone is transmitted to the subscriber line only when the circuit of said subscriber line is completed and when said discharge tube is non-conductive.

2. A circuit-arrangement, as set forth in claim 1, wherein said means for connecting the busy-tone generator includes a pair of resistors connected in series between a point of said first resistor and a point of said second resistor, and a rectifier having one end connected to the junction of said pair of resistors and the other end connected to receive signals from said busy-tone generator.

3. A circuit-arrangement in an automatic telephone system in which an intelligence connection between a subscriber line and a further connecting apparatus is established through a discharge path of a discharge tube, comprising a first resistor, a transformer having a first winding, a second winding and a third winding, said first winding being connected between a discharge electrode of said discharge tube and one end of said first resistor, the other end of said resistor being connected to electrical ground, a first capacitor connected across said first resistor, a second capacitor connected between one end of said second winding and one end of said third winding, the other ends of said second and third windings being connected to said subscriber line to receive signals therefrom, means for selectively completing the circuit of said subscriber line, a second resistor connected between electrical ground and the junction point of said second winding and said second capacitor, a third resistor connected between a point of negative potential and the junction of said second capacitor and said third winding, a pair of resistors connected in series between the junction of said second resistor and said second coil and the junction of said first resistor and said first winding, and a series-connected combination of a busy-tone generator means, a source of negative potential, and a rectifier, said combination being connectde between electrical ground and the junction of said pair of resistors, said rectifier being arranged so that the voltage at the junction of said pair of resistors controls said rectifier in a manner such that a busy-tone from said busy-tone generator is transmitted to said subscriber line when the circuit of said subscriber line is completed and when said discharge tube is inactive.

References Cited in the file of this patent

UNITED STATES PATENTS 2,245,160, Schimpf -------------- June 10, 1941